United States Patent [19]

Meginnis, deceased

[11] 4,436,375

[45] Mar. 13, 1984

[54] SIGHT GLASS APPARATUS

[75] Inventor: Charles E. Meginnis, deceased, late of Charleston, W. Va., by Stanley T. McKeny, executor

[73] Assignee: Pressure Products Company, Charleston, W. Va.

[21] Appl. No.: 353,924

[22] Filed: Mar. 2, 1982

[51] Int. Cl.³ .................... G02B 5/00; G02B 7/00; G01F 23/02
[52] U.S. Cl. .................... 350/319; 350/589; 73/334
[58] Field of Search .............. 350/319, 589, 252, 257; 73/334, 328–331, 326

[56] References Cited

U.S. PATENT DOCUMENTS

| | | | |
|---|---|---|---|
| 3,345,872 | 10/1967 | Meginnis | 73/334 |
| 3,746,431 | 7/1973 | Meginnis | 73/334 |
| 3,951,301 | 4/1976 | Meginnis | 73/334 |

*Primary Examiner*—Jon W. Henry
*Attorney, Agent, or Firm*—Lalos, Leeds, Keegan, Lett & Marsh

[57] ABSTRACT

A sight glass assembly comprising a housing structure having a circular opening therethrough, the opening having an enlarged section, a lens disposed across the opening and having a peripheral portion received within the enlarged section of the housing structure opening, a sealed ring assembly disposed in the enlarged section of the housing structure opening, the sealing ring assembly comprising a rigid compression ring and a resilient packing member mounted on the compression ring, the packing member having an L-shaped cross-sectional configuration including a wall portion mounted on an inner side of the compression ring and engaging the periphery of the lens and a flange portion mounted on the compression ring and engaging the housing structure, and means mounted on the housing structure and engageable with the compression ring for urging the compression ring against the packing member, causing the packing member to expand radially, thereby effecting a seal between the housing structure and the periphery of the lens and placing the lens in radial compression.

10 Claims, 5 Drawing Figures

SIGHT GLASS APPARATUS

This invention relates to a sight glass assembly and more particularly to a sight glass assembly of the type mountable on reaction vessels and the like for viewing the interior thereof.

In the prior art, there has been developed a type of sight glass assembly wherein the lens thereof is placed in radial compression for the purpose of preventing a blowout of the lens when the lens becomes fractured. Usually, such assemblies include a resilient packing member interposed between the housing structure of the assembly and a lens mounted in the housing structure, and means for compressing the packing member to expand the packing member radially, effecting a seal between the housing structure and the periphery of the lens and placing the lens in radial compression. Many of such types of constructions, however, have been found to be unduly complex in design and correspondingly, comparatively expensive to manufacture. It thus has been found to be desirable to provide such a sight glass assembly which is not only effective in performance but simple in design and comparatively inexpensive to manufacture.

Accordingly, it is the principal object of the present invention to provide an improved sight glass assembly.

Another object of the present invention is to provide an improved sight glass assembly mountable across an opening in an reaction vessel and the like for viewing the interior of the vessel.

A further object of the present invention is to provide an improved sight glass assembly of the type in which the lens thereof is placed in radial compression.

A still further object of the present invention is to provide an improved sight glass assembly of the type utilizing a compressed packing member which places the lens in radial compression thus preventing a blowout of lens when it becomes fractured.

Another object of the present invention is to provide an improved sight glass assembly of the type in which the lens is placed in radial compression which is comparatively simple in design, relatively inexpensive to manufacture and highly effective in performance.

Other objects and advantages of the present invention will be become more apparent to those persons having ordinary skill in the art to which the present invention relates from the following description taken in conjunction with the accompanying drawings wherein.

Figure 1:
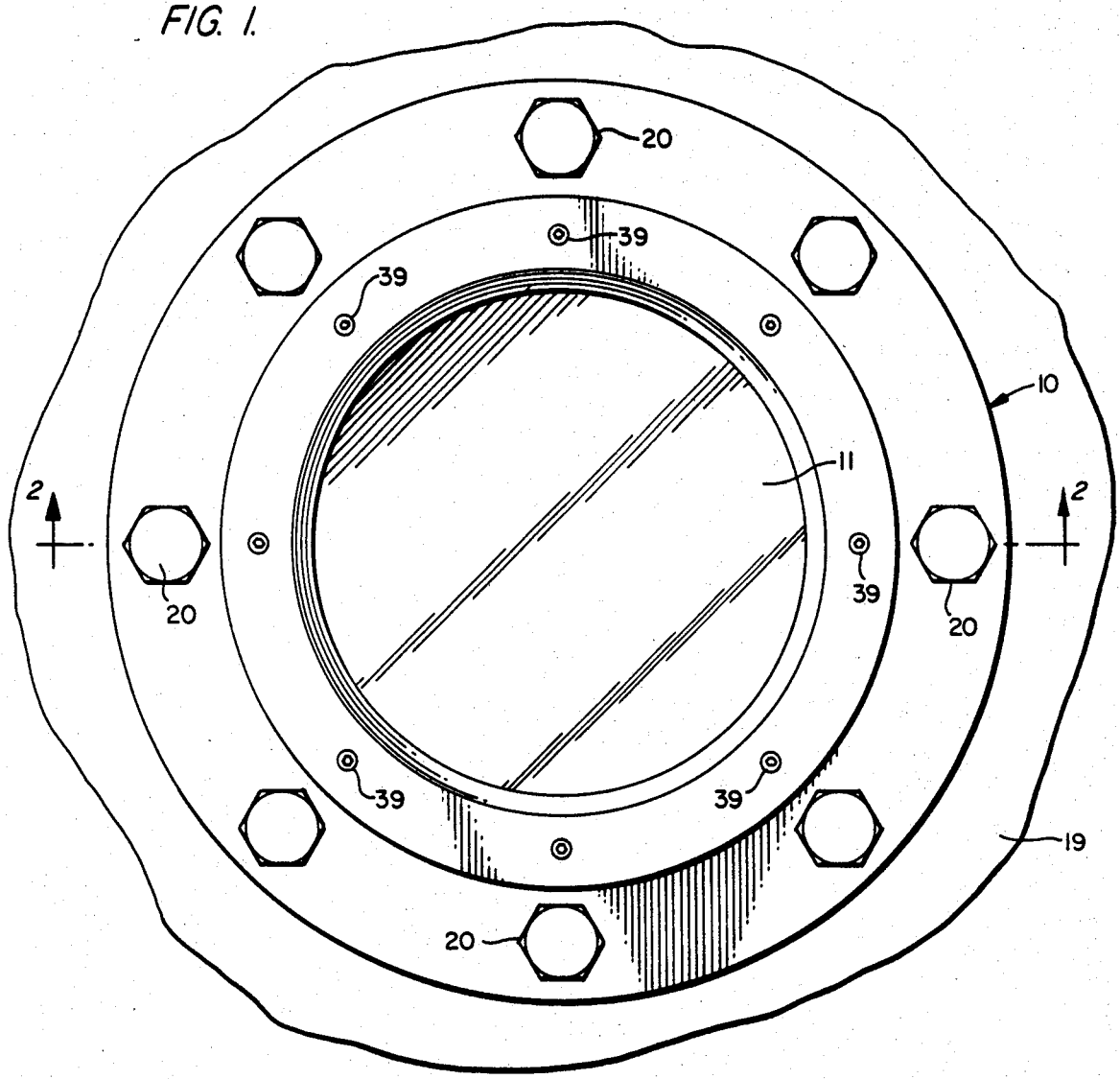
FIG. 1 is a top plan view of an embodiment of the invention.
Figure 2:
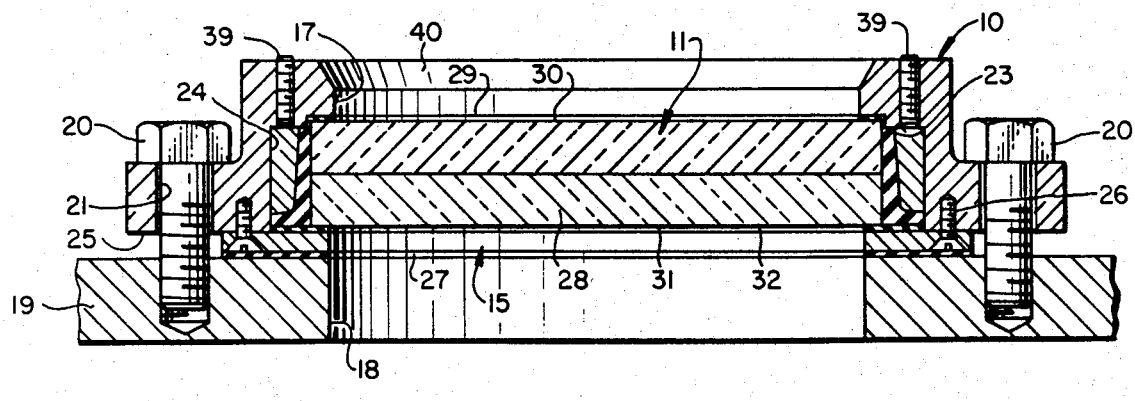
FIG. 2 is a cross-sectional view taken along line 2—2 in FIG. 1.
Figure 3:
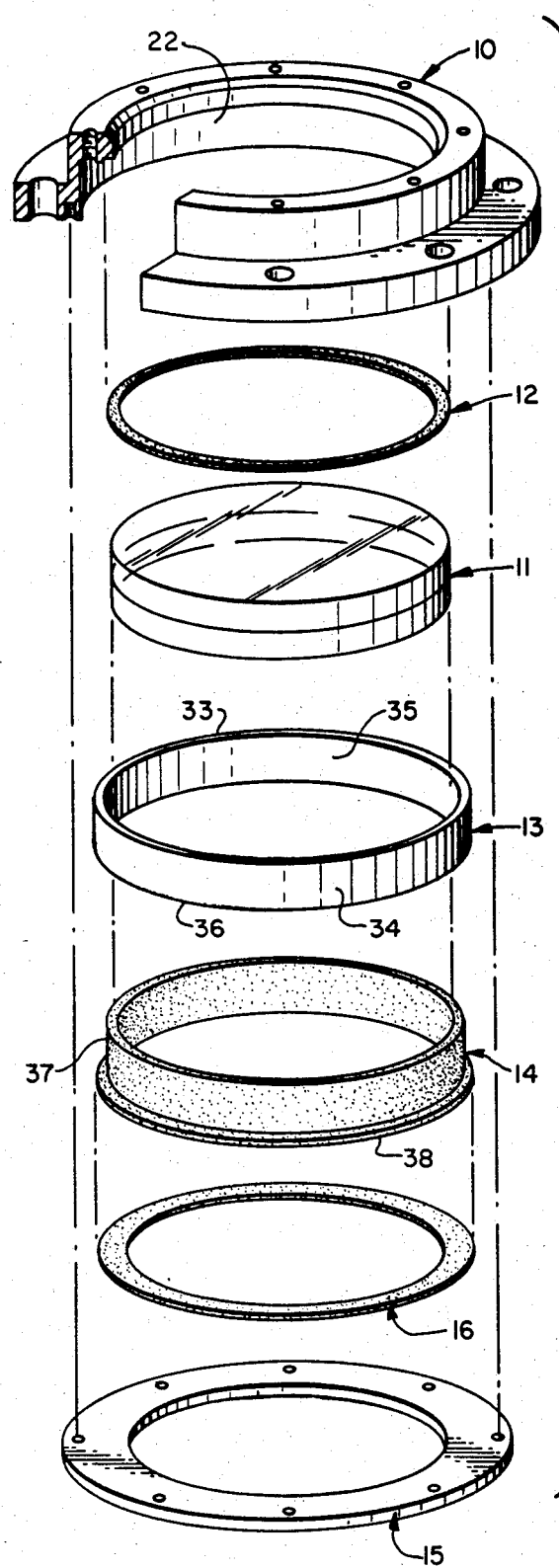
FIG. 3 is an exploded view of the embodiment illustrated in FIGS. 1 and 2.

The embodiment of the invention shown in FIGS. 1 through 3 generally includes a housing structure 10, a lens 11 mounted in the housing structure, a gasket 12 disposed between the lens and the housing structure, a sealing ring assembly mounted between the periphery of the lens and the housing structure, consisting of a compression ring 13 and a packing member 14 mounted on the compression ring, a face plate 15 mounted on the housing structure for supporting the sealing ring assembly and the lens within the housing structure and a gasket 16 disposed between the lens and sealing ring assembly and the face plate.

The housing structure generally has an annular configuration, providing an opening 17 adapted to register with an opening 18 in a wall 19 of a vessel containing a fluid possibly corrosive in nature and at an elevated pressure and/or temperature. The housing structure is secured to the vessel by means of a plurality of bolts 20 extending through suitable openings 21 circumferentially spaced in the housing structure, which are adapted to register with threaded holes in the wall of the vessel. The opening in the housing structure is provided with an enlarged section 22 which provides an annular shoulder 23 at the outer end thereof and an annular wall 24.

Annular face plate 15 is provided with an inner diameter approximately equal to the diameter of opening 17 in the housing structure and an outer diameter greater than the diameter of enlarged section 22 in the housing structure so that when the face plate is mounted on the housing structure with the opening therein registered with opening 17 of the housing structure, an inner portion of the face plate will be disposed in opposed relation to annular shoulder 23 and an outer portion thereof will engage an inner surface 25 of the housing structure. As best shown in FIG. 2, the face plate is firmly secured to the housing structure by a set of screws 26 and is provided with a gasket 27 when the housing structure is mounted on vessel wall 19. Preferably, the face plate is formed of a corrosion resistant material, such as stainless steel, so that it will not corrode when subjected to corrosive substances in the vessel on which the assembly is mounted.

Lens 11 is circular in configuration having an outside diameter greater than the diameter of opening 17 in the housing structure and smaller than the diameter of enlarged section 22 of opening 17. As best shown in Figure 2, the lens is mounted in the housing structure across opening 17 so that the periphery of the lens is disposed between annular shoulder 23 and face plate 15 and peripheral wall 28 is spaced from annular wall 24 of the enlarged section of opening 17. Glass to metal contact is avoided by a gasket 29 disposed between annular shoulder 23 and the periphery of outer face 30 of the lens and a gasket 31 disposed between the periphery of inner face 32 of the lens and face plate 15.

Compression ring 13 is formed of any rigid material, preferably a corrosive resistant material. It includes an upper edge 33 engageable with shoulder 23, an outer surface 34 engageable with annular wall 24 of the enlarged section of opening 17, an inner surface 35 and an opposite edge 36. The packing member mounted on the compression ring is formed of a resilient material, preferably a commercially available elastomer, and has a substantially L-shaped cross-sectional configuration including an annular wall portion 37 and an annular flange portion 38. Wall portion 37 of the packing member is mounted on the inner side of compression ring 13 and also engages peripheral surface 28 of lens 11. The flange portion of the packing member is mounted on edge 36 of the compression ring and engages gasket 31 seated on annular face plate 15. As illustrated in FIG. 2, the sealing ring assembly occupies the entire space between the periphery of the lens and annular wall 24 of the enlarged section of opening 17 so that any longitudinal movement of the compression ring will compress the packing member causing it to expand laterally. Such lateral expansion of the packing member has the effect of providing a seal between the periphery of the lens and the housing structure and also of placing the lens in radial compression. Under such conditions, fluid contained in the vessel on which the assembly is mounted will be prevented from escaping to the exterior through the assembly between the lens and the housing structure and, because of the compressive forces applied to the periphery of the lens, the lens will be prevented from blowing out in the event it becomes fractured.

The packing member is compressed by means of a plurality of set screws 39 threaded into circumferentially spaced openings in the housing structure and engaging edge surface 33 of the compression ring. It will be appreciated that when the set screws are threaded into the housing structure, the compression ring will be urged towards the face plate, compressing the flange portion of the packing member and thus causing it to expand laterally. Periodically, as the material of the packing member begins to set and lose its resiliency, set screws 39 can be tightened to maintain the desired compressive force about the periphery of the lens. In the event the packing member deteriorates beyond the point of usefullness, it may readily be replaced.

To assemble the sight glass assembly as shown in FIGS. 1 through 3, the housing structure is first placed on a working surface with outer surface 40 down, and gasket 29 is inserted in the enlarged section of opening 17 and seated on annular shoulder 23. The packing member is then mounted on the compression ring and the assembly thus formed is inserted in the enlarged section of opening 17 so that edge surface 33 of the compression ring is seated on annular shoulder 23. The packing member may be mounted on the compression ring without any adhesive agent or the flange portion thereof may be adhesively secured to the compression ring with any type of suitable adhesive.

With the sealing ring assembly thus positioned, the lens is inserted in the housing structure so that the periphery of outer face 30 of the lens is seated on gasket 29 and peripheral surface 28 engages the packing member. Gasket 31 is then placed on the packing member and the periphery of inner face 32 of the lens and face plate 15 is positioned on gasket 31. The face plate is then mounted on the housing structure by means of screws 26 to firmly secure the lens with the sealing ring assembly about the periphery thereof in the housing structure.

The assembly is mounted on vessel wall 19 by positioning the assembly across opening 18 with gasket 27 disposed between the vessel wall and face plate 15 and bolt holes 21 registered with the threaded holes in the vessel wall, and inserting bolts 20 through bolt holes 21 and threading them into the holes in the vessel wall. After the assembly has thus been firmly secured to the vessel wall, set screws 39 may be tightened to expand the packing member laterally and thus form a seal between the periphery of the lens and the housing structure and place the lens in radial compression. The vessel with the sight glass assembly thus mounted is then ready to be placed in service.

To disassemble the unit for the purpose of replacing the lens or the packing member, the procedure as described essentially is reversed. It will be appreciated that a fractured lens can simply be removed by inverting the unit, knocking out the pieces, and inserting a new lens in the sealing ring assembly, and that the packing member can be replaced simply by removing the lens and the sealing ring assembly, inserting a new sealing ring assembly and completing the assembly of the unit. By mounting the packing member on the compression ring and removing and installing the compression ring and packing member as a unit, the assembly and disassembly of the unit is facilitated and the down time of the vessel during replacement of the components of the unit is minimized.

Figure 4:
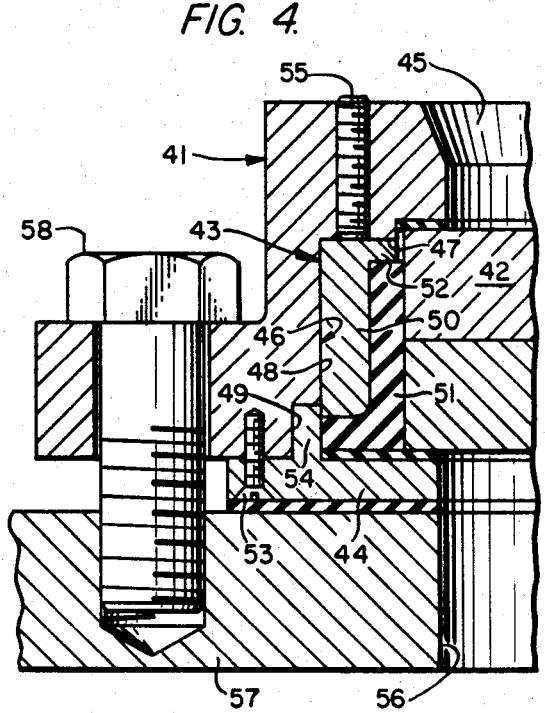
FIG. 4 is a fragmentary, vertical cross-sectional view of another embodiment of the invention.

FIG. 4 illustrates a modification of the invention shown in FIGS. 1 through 3. Such modification includes a housing structure 41, a lens 42 mounted in the housing structure, a sealing ring assembly 43 mounted in the housing structure between the periphery of the lens and the housing structure and a face plate 44 mounted on the housing structure and supporting the lens and sealing ring assembly. The housing structure is provided with a circular opening 45 therethrough having an enlarged section 46 providing an annular shoulder 47 and an annular wall 48. The inner end of annular wall 48 is recessed as at 49. The sealing ring assembly consists of a compression ring 50 and a packing member 51. Compression ring 50 is comparable to compression ring 13 described in connection with the embodiment shown in FIGS. 1 through 3, and is further provided with an inwardly projecting flange 52 which engages an end of the packing member. Annular face plate 44 is secured to the housing structure by means of a set of screws 53 and is provided with an annular flange 54 which is received in recess 49. Face plate 44 is formed of a corrosive resistant material so that it will resist corrosive attack by the fluid contained within the vessel and furthermore will shield the packing member from any corrosive effects of the material from which the housing structure is formed. The packing member is compressed by a set of screws 55 which engage the compression ring and force it against the packing member. The unit is adapted to be mounted across an opening 56 of a vessel wall 57 by means of a plurality of mounting bolts 58.

Figure 5:
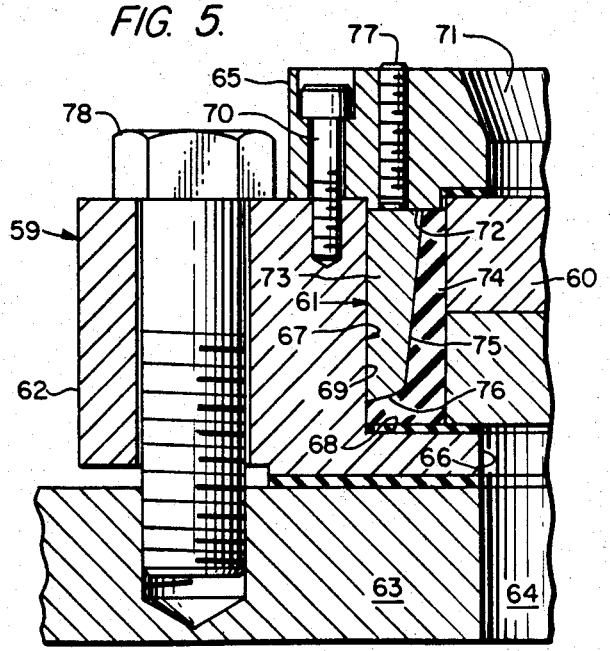
FIG. 5 is a similar vertical cross-sectional view of still another embodiment of the present invention.

FIG. 5 illustrates another modification of the assembly, as shown in FIGS. 1 through 3. Such modification includes a housing structure 59, a lens 60 mounted in the housing structure and a sealing ring assembly 61 mounted in the housing structure between the periphery of the lens and the housing structure. Housing structure 59 consists of an inner section 62 mounted on a vessel wall 63 having an opening 64 and an outer section 65. Inner housing section 62 is provided with a circular opening 66 therethrough which is adapted to register with opening 64 in the vessel wall, having an enlarged section 67 providing an annular seating surface 68 and an annular wall 69. Outer housing section 65 is mounted on inner housing section 62 and secured thereto by means of a set of screws 70. The outer housing section is provided with an opening 71 therethrough which registers with opening 66 in the inner housing section, and also an annular portion 72 protruding slightly into enlarged section 67 of inner housing section opening 66.

As in the other embodiments, lens 60 is positioned across openings 71 and 66, having the periphery thereof interposed between the housing sections and spaced from annular wall 67. Sealing ring assembly 61 is interposed between the periphery of the lens and wall 67, and consists of a compression ring 73 and a packing member 74. The compression ring is comparable to compression ring 13 described in connection with the embodiment shown in FIGS. 1 through 3. It is provided, however, with an inner surface 75 disposed at an angle relative to the peripheral wall of the lens, and an end surface 76 disposed at an acute angle relative to the peripheral wall of the lens. The packing member is compressed by means of a plurality of set screws 77 which bear upon the compression ring and urge it into engagement with the packing member. It will be appreciated that angled surfaces 75 and 76 provide a more uniform expansion of the packing member along its entire length in placing the lens in radial compression. As in the aforementioned embodiments, the assembly is adapted to be mounted on vessel wall 63 by means of a set of mounting bolts 78.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

I claim:

1. A sight glass assembly comprising a housing structure having a circular opening therethrough, said opening having an enlarged section, a lens disposed across said opening and having a peripheral portion received within said enlarged section, a sealing ring assembly disposed in said enlarged section, said sealing ring assembly comprising a rigid compression ring and a resilient packing member mounted on said compression ring, said packing member having an L-shaped cross-sectional configuration including a wall portion mounted on an inner side of said compression ring and engaging the periphery of said lens and a flange portion mounted on said compression ring and engaging said housing structure, and means mounted on said housing structure and engageable with said compression ring for urging said compression ring against said packing member, causing said packing member to expand radially, thereby effecting a seal between said housing structure and the periphery of said lens and placing said lens in radial compression.

2. A sight glass assembly according to claim 1 wherein said means for urging said compression ring against said packing member comprises a set of screws threaded in openings provided in said housing structure and engageable with said compression ring.

3. A sight glass assembly according to claim 1 including gaskets disposed between said lens and said housing structure.

4. A sight glass assembly according to claim 1 wherein said compression ring includes an inner surface disposed at an angle relative to the periphery of said lens.

5. A sight glass assembly according to claim 4 wherein said compression ring includes an end surface disposed at an acute angle relative to the periphery of said lens.

6. A sight glass assembly according to claim 1 wherein said compression ring includes an inwardly projecting flange engaging an end of the wall portion of said packing member.

7. A sight glass assembly according to claim 1 wherein said housing structure includes a main body section and a face plate mounted on said main body section, engaging the flange portion of said packing member and supporting an end of said lens.

8. A sight glass assembly according to claim 7 wherein said face plate includes a flange disposed between the flange portion of said packing member and the main body portion of said housing structure.

9. A sight glass assembly according to claim 1 wherein said housing structure includes a main body section and an end section mounted on said main body section and having a portion engaging said compression ring.

10. A sight glass assembly according to claim 1 wherein said compression ring is formed of a corrosion resistant material.

* * * * *